No. 662,756. Patented Nov. 27, 1900.
H. B. BINGHAM.
BREAD CUTTER.
(Application filed Dec. 20, 1899.)

(No Model.)

WITNESSES
Fenton S. Pelt,
E. V. Byng.

INVENTOR
Herbert B. Bingham

UNITED STATES PATENT OFFICE.

HERBERT B. BINGHAM, OF NASHUA, NEW HAMPSHIRE.

BREAD-CUTTER.

SPECIFICATION forming part of Letters Patent No. 662,756, dated November 27, 1900.

Application filed December 20, 1899. Serial No. 741,039. (No model.)

*To all whom it may concern:*

Be it known that I, HERBERT B. BINGHAM, a citizen of the United States, residing at Nashua, in the county of Hillsborough and State of New Hampshire, have invented certain new and useful Improvements in Bread-Cutters; and I do hereby declare the following to be a full, clear, and exact description of the invention, such as will enable others skilled in the art to which it appertains to make and use the same.

My invention relates to a device for cutting bread, cake, and the like into slices of any desired thickness; and the invention consists of a suitably hinged or folding frame or body portion which can be readily "knocked down" for shipment or for the purpose of being stored or hung up and which can be as readily "set up," by which when this is done and the gage properly set bread, cake, and the like can be perfectly cut into slices of any desired thickness, all as will be hereinafter described and specifically claimed.

Figure 1:
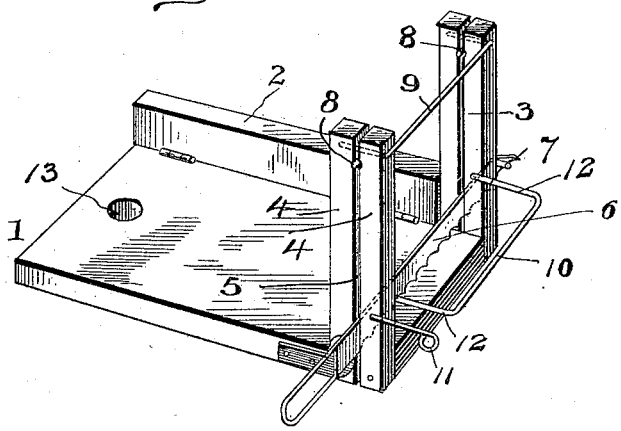
Figure 2:
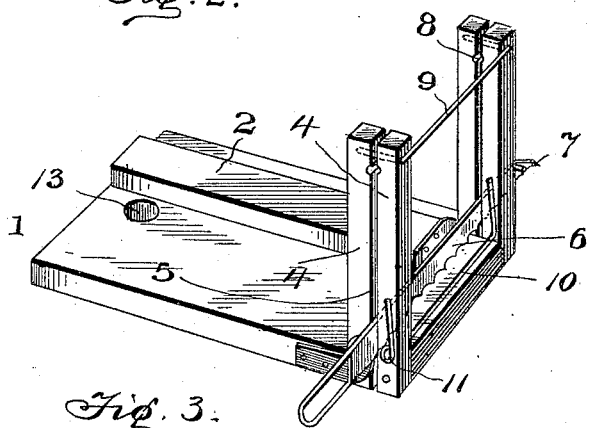
Figure 3:
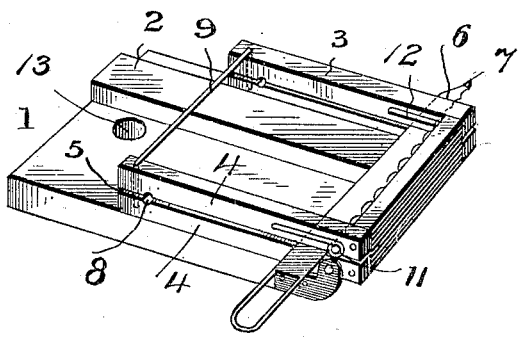

In the accompanying drawings, Figure 1 is a perspective view of my improved bread or cake cutting device in a set-up condition and ready for operation. Fig. 2 is a similar view showing the guide for the bread or cake in a lowered position, and Fig. 3 is a perspective view of the device in a knocked down or folded condition ready for shipment or storage.

1 in the drawings represents the base or bottom board of the device, to which is hinged a vertically-extending guide 2 for directing the movement of the bread or cake being cut to the knife. As shown in Figs. 2 and 3, this guide 2 can be folded downwardly upon the base 1 for bringing it into a compact condition. To the front end of the base 1 is hinged the knife-guide 3, which, as shown in Fig. 3, is designed to be folded down upon the base to also bring it into a compact condition and when turned up in the position shown in Fig. 1 to be held in said position by bringing the end of the guide 2 against the same, so that it will be held steadily in place and cannot be lowered without first lowering the guide 2. This knife-guide 3 consists of a substantially U-shaped frame, the sides of the frame being preferably formed of two bars 4 4, with a space 5 for the accommodation and movement of the cutting-knife 6, which knife may be of any suitable pattern, but preferably one having a serrated cutting edge, as shown, so that in giving the knife a movement to make a "draw" cut it will cut the bread or cake very smoothly and rapidly. An important feature of the knife is that it is provided with a bent end 7, which extends at substantially a right angle to the major portion of the blade, so as to engage the outer surface of one of the upright standards of the knife-guide, and thereby prevent the knife from becoming accidentally disengaged from said guide during the operation of cutting, which would likely take place at each movement of the knife if the bent end 7 was not provided. To facilitate the ready insertion and removal of the knife from the knife-guide when desired, each of the standards is provided with an enlarged aperture 8, which will readily receive the hooked or bent end of the knife, but which openings, being located near the upper end of the standards, will not admit of the knife being accidentally disengaged from the guide for the reason that the cutting operation does not require the bent end of the knife-blade to come in line with said enlarged openings 8. The standard of the knife-guide need not necessarily be constructed of two separate pieces, but each standard may consist of a single piece provided with a vertical slot for the movement of the knife.

The figure 9 represents a U-shaped piece of wire which extends across and connects the upright standards of the knife-guide, its bent ends extending through the said standards, and is found useful for holding the upper separated ends of each standard more closely together and prevent them spreading too much.

The gage for regulating the thickness of the slice to be cut consists of a piece of bent wire 10, which is pivoted in the standard of the knife-guide and is provided with an end extension 11, which constitutes a handle for raising and lowering the gage for bringing the latter nearer to or farther away from the material which is to be sliced, and consequently regulate the thickness of the slice. The handle portions 11 11 and the portions 12 12 of the gage bearing very closely upon the side surfaces of the vertical standards of the knife-guide and extending backwardly and downwardly tend to hold the gage securely in place until positively changed by the hand of the operator, which of course can be very readily accomplished. The base or bottom board is preferably provided with an aperture 13, which extends through the same and which will be found useful when it is desired to hang up the device.

While I have described my invention as being useful for slicing bread and cake, it is of course obvious that it will be found just as useful in slicing other articles—as, for instance, vegetables and fruit and cold meats.

The gage for regulating the thickness of the slices being cut will also be found useful in pushing the cut slices out of the way by simply moving the same upward, which will tumble the slices over away from the knife.

Having now described my invention, what I claim as new, and desire to secure by Letters Patent, is—

1. In a bread-cutter, the combination with a base-board, of a knife-guide pivoted at one end thereof to fold flat thereon, and a bread-guide pivoted to and adapted to fold upon the top of the base at a right angle to the knife-guide in position to serve, when in its raised or operative position, as a stop to hold the knife-guide in its vertical or operative position, substantially as described.

2. A bread-cutter comprising a base, a knife-guide having an upright at each side of the base, and a slice-gage comprising a bail or U-shaped bar having its arms pivoted inside the uprights, the bail depending in a position to bring it but slightly above the horizontal plane of the base, and being adjustable on its pivots and secured in any adjustment by frictional contact with the uprights, substantially as described.

In testimony whereof I hereunto affix my signature in presence of two witnesses.

HERBERT B. BINGHAM.

Witnesses:
R. T. SMITH,
J. L. CLOUGH.